United States Patent [19]
Ito et al.

[11] Patent Number: 5,747,633
[45] Date of Patent: May 5, 1998

[54] RESIN COMPOSITION HAVING IMPROVED MECHANICAL PROPERTIES AND BIO-DISINTEGRATING PROPERTY AND CONTAINERS COMPRISING THEREOF

[75] Inventors: Takurou Ito; Yoshitsugu Maruhashi, both of Yokohama, Japan

[73] Assignee: Toyo Seikan Kaisha, Ltd., Tokyo, Japan

[21] Appl. No.: 668,717

[22] Filed: Jun. 24, 1996

Related U.S. Application Data

[63] Continuation of Ser. No. 343,985, Nov. 18, 1994, abandoned.

[30] Foreign Application Priority Data

Nov. 18, 1993 [JP] Japan .................................. 5-289624

[51] Int. Cl.$^6$ .................................................. C08G 63/02
[52] U.S. Cl. ........................ 528/272; 528/275; 428/35.7; 525/56; 525/437; 525/447; 525/456
[58] Field of Search ................................ 528/272, 275; 428/35.7; 525/56, 437, 447, 456

[56] References Cited

U.S. PATENT DOCUMENTS 4,621,129 11/1986 Yoshimura et al. .............. 528/176
5,324,556 6/1994 Hino et al. ........................ 528/272

*Primary Examiner*—John M. Cooney, Jr.
*Attorney, Agent, or Firm*—Sughrue, Mion, Zinn, Macpeak & Seas, PLLC

[57] ABSTRACT

A resin composition comprising a saturated polyester resin consisting chiefly of a hydroxyalkanoate unit, a heat-moldable hydroxyl group-containing resin having a vinyl alcohol unit, and an alkaline earth metal carbonate, a molded article composed of this resin composition and, particularly, a container and a multi-layer plastic container having an outer layer formed of this resin composition and an inner layer of a resin consisting chiefly of an ethylene-vinyl alcohol copolymer. The resin composition and the molded articles thereof exhibit not only excellent mechanical properties but also excellent bio-disintegrating property.

8 Claims, 5 Drawing Sheets

F I G. 1
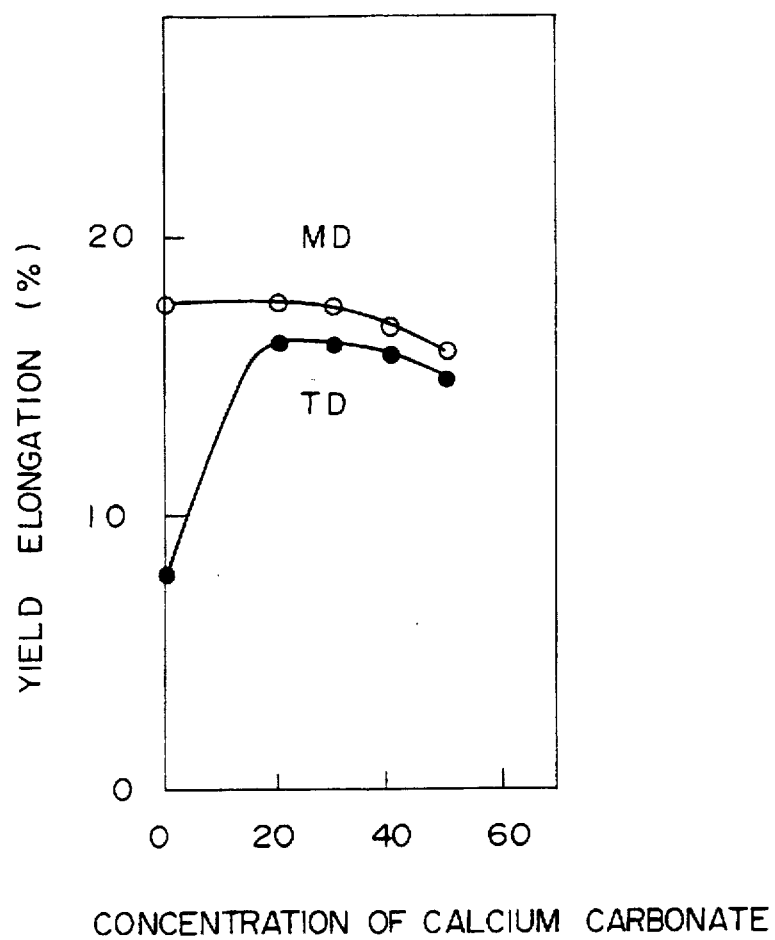

RESIN COMPOSITION HAVING IMPROVED MECHANICAL PROPERTIES AND BIO-DISINTEGRATING PROPERTY AND CONTAINERS COMPRISING THEREOF

This is a Continuation of application Ser. No. 08/343,985 filed Nov. 18, 1994 which is now abandoned.

BACKGROUND OF THE INVENTION

1. Field of the Invention

The present invention relates to an aliphatic polyester resin composition having improved bio-disintegrating property and mechanical properties and, particularly, improved anisotropy in the mechanical strength and anisotropy in the thermal contraction and improved bio-disintegrating property, and further relates to containers using the same resin composition.

2. Description of the Prior Art

Amounts of solid wastes produced by cities are increasing year after year and are approaching the limit of the capacity of waste disposal. One of the culprits of solid wastes comes from the plastic materials as is always pointed out.

Disintegrable plastics are drawing attention as an ideal solution for the plastic wastes. The disintegrable plastics may include photo-disintegrable plastics of which the polymer chains are cut by ultraviolet rays and bio-disintegrable plastics that disintegrate due to the action of enzymes emitted from bacteria and true fungi.

The photo-disintegrable plastics, however, will not disintegrate as expected when they are buried in the earth and, besides, the disintegrated products thereof may contaminate the environment. Accordingly, much expectation has been placed on the bio-disintegrable plastics.

As the bio-disintegrable plastics, there have heretofore been known a polyhydroxybutylate (PHA), a 3-hydroxybutylate (3HB) and a 3-hydroxyvalerate (3HV).

There has also been known a resin composition obtained by blending a bio-disintegrable plastic such as a polycaprolactone (PCL) with another resin. For instance, Japanese Laid-Open Patent Publication No. 139248/1992 discloses a bio-disintegrable resin composition comprising 5 to 99% by weight of an ethylene-vinyl alcohol copolymer and 95 to 1% by weight of an aliphatic polyester.

Furthermore, Japanese Laid-Open Patent Publication No. 84876/1993 discloses a bio-disintegrable resin laminate comprising a bio-disintegrable polyester/a polyvinyl alcohol/a bio-disintegrable polyester.

The known bio-disintegrable plastics remain stable in the air and are disintegrated in the earth and in the water where bacteria are active. The disintegrated products turn into a carbonic acid gas and the water still accompanied, however, by problems in regard to properties of molded articles such as containers which account for a major use of the plastics and the production, which must be solved.

That is, the conventional PHA bio-disintegrable plastics have a decomposition temperature and a molding temperature which are close to each other like 180° to 190° C. and 170° to 175° C., and with which the molded articles are prepared by a casting method using a solvent such as chloroform or the like but is melt-molded with difficulty. To accomplish this, a plasticizer must be contained in large amounts in the resin to improve melt-extrusion property. With the thus produced container, however, the plasticizer oozes into the water (content) which is not desirable.

The PCL bio-disintegrable plastics, on the other hand, have a melting point of as low as 60° C. arousing problem in regard to the heat resistance. Moreover, the bio-disintegrating plastics are expensive. Therefore, great advantage can be expected from the standpoint of melt-moldability and manufacturing cost if they can be used being blended with other resins without impairing the bio-disintegrating property. A hydroxyl group-containing polymer has heretofore been known as a bio-disintegrable polymer in addition to bio-disintegrable polyesters. The hydroxyl group-containing polymer, however, is soluble in water, has a poor resistance against the water and lacks melt-moldability, and cannot be used for the object of the present invention.

The ethylene-vinyl alcohol copolymer taught by the prior art has a melt-moldability and exhibits relatively excellent resistance against the water compared with other hydroxyl group-containing polymers. Like other hydroxyl group-containing polymers, the ethylene-vinyl alcohol copolymer does not necessarily exhibit a sufficient degree of compatibility to the aliphatic polyester. When molded, therefore, the ethylene-vinyl alcohol copolymer develops phase isolation, resulting in the occurrence of cracks and making it difficult to prevent the permeation of gases as expected.

That is, a conventional blend of the bio-disintegrable saturated polyester resin and the hydroxyl group-containing resin have an anisotropy in that the mechanical strength of the molded article is small in the transverse direction (TD) compared with the strength in the mechanical direction (MD). Besides the blend easily cracks in the mechanical direction, and this defect has not yet been solved.

Similar defects are exhibited even in the heat resistance of the molded articles made of the above blend. That is, the molded article that is immersed in the hot water undergoes the thermal contraction to a conspicuous degree in the mechanical direction (MD) though the thermal contraction is relatively small in the transverse direction (TD), resulting in the occurrence of anisotropic thermal deformation. This defect has not yet been solved, either.

SUMMARY OF THE INVENTION

The object of the present invention therefore is to provide a saturated polyester resin composition which is free from the above-mentioned defects inherent in the conventional bio-disintegrable polyester compositions, free from anisotropy in the mechanical strength and anisotropy in the thermal properties of the molded articles, and exhibits markedly improved bio-disintegrating property.

Another object of the present invention is to provide a molded article which consists of the above-mentioned resin composition and, particularly, a plastic container which consists of the above-mentioned resin composition and exhibits very excellent bio-disintegrating property without having anisotropy in the mechanical strength and anisotropy in the thermal properties.

A further object of the present invention is to provide a multi-layer plastic container having an outer layer consisting of the above-mentioned resin composition and an inner layer consisting chiefly of an ethylene-vinyl alcohol copolymer.

According to the present invention, there is provided a resin composition having improved mechanical properties and bio-disintegrating property comprising a saturated polyester resin consisting chiefly of a hydroxyalkanoate unit, a heat-moldable hydroxyl group-containing resin having a vinyl alcohol unit, and n alkaline earth metal carbonate.

It is desired that the composition of the present invention comprises the saturated polyester resin in an amount of from 25 to 85.5% by weight, the hydroxyl group-containing resin in an amount of from 2.5 to 45% by weight and the alkaline earth metal carbonate in an amount of from 10 to 50% by weight based on the three components.

The composition of the present invention is prepared by selecting an alkaline earth metal carbonate out of a variety of fillers, and blending it with a system of a saturated polyester resin consisting chiefly of a hydroxyalkanoate unit and a hydroxyl group-containing resin having a vinyl alcohol unit. This makes it possible to eliminate anisotropy in the mechanical strength and anisotropy in the thermal properties of the molded articles, and to obtain markedly improved bio-disintegrating property.

According to the present invention, furthermore, there is provided a container which consists of the above-mentioned resin composition, and a multi-layer plastic container having an outer layer consisting of the above-mentioned resin composition and an inner layer consisting chiefly of the ethylene-vinyl alcohol copolymer.

The container molded by using the resin composition of the present invention is free from anisotropy in the mechanical strength and anisotropy in the thermal properties when it is being used, and is excellently bio-disintegrated when it is discarded, and does not cause "plastic hazard".

In particular, the multi-layer plastic container has an outer layer consisting of the above-mentioned composition free from anisotropy in the mechanical properties and anisotropy in the thermal properties and having excellent bio-disintegrating property, and has an inner layer of the ethylene-vinyl alcohol copolymer having excellent property for preventing the permeation of gases and solvent vapors as well as resistance against oils. Therefore, the multi-layer plastic container is not only excellent in mechanical strength, heat resistance and preservation of content when it is being used but also permits the outer layer to be quickly bio-disintegrated when it is discarded and permits the ethylene-vinyl alcohol copolymer of the inner layer to be disintegrated, too, without causing plastic hazard.

BRIEF DESCRIPTION OF THE DRAWINGS

FIG. 1 is a graph plotting a relationship between the number of parts of a calcium carbonate that is blended and the yield elongation (%) in the mechanical direction (MD) and in the transverse direction (TD) using molded articles of a composition obtained by adding the calcium carbonate into the blend of a saturated polyester resin and a hydroxyl group-containing resin;

DETAILED DESCRIPTION OF THE PREFERRED EMBODIMENTS

The present invention will now be described in further detail with reference to the drawings.

FIG. 1 is a graph plotting a relationship between the number of parts of a calcium carbonate that is blended and the yield elongation (%) in the mechanical direction (MD) and in the transverse direction (TD) using molded articles of a composition obtained by adding the calcium carbonate into the blend of the saturated polyester resin and a hydroxyl group-containing resin.

It will be understood from FIG. 1 that with the conventional blend, the yield elongation in the transverse direction (TD) is very smaller than the yield elongation in the mechanical direction (MD), causing cracks to develop. When the blend is further blended with the calcium carbonate in accordance with the present invention, on the other hand, the yield elongation can be greatly increased in the transverse direction (TD) without decreasing the yield elongation in the mechanical direction (MD); i.e., yield elongations in the mechanical direction (MD) and in the transverse direction (TD) are balanced at a high level.

The above-mentioned improvement of the present invention is specific to a combination of a filler of an alkaline earth metal carbonate and the above-mentioned blend. For instance, a composition blended with talc which is a representative filler in an amount of 40% by weight exhibits yield elongations of as small as 8% and 5% in the mechanical direction (MD) and in the transverse direction (TD), respectively. Besides, even the compositions blended with a feldspar filler which helps obtain a large yield elongation among the fillers in an amount of 40 parts by weight, exhibit yield elongations in the mechanical direction (MD) and in the transverse direction (TD) of 14% and 9%, respectively, and develop cracks in the 180-degree bending test that will be described in the Examples appearing later. Accordingly, the present invention obviously presents unexpected effects.

Furthermore, a molded article of a blend of a saturated polyester resin and a hydroxyl group-containing resin after immersed in the hot water of 70° C. for 60 minutes, exhibits a thermal coefficient of contraction of 25% in the mechanical direction (MD) and a thermal coefficient of contraction of 0.4% in the transverse direction (TD), the thermal coefficient of contraction in the mechanical direction (MD) being very larger than the thermal coefficient of contraction in the transverse direction (TD) exhibiting anisotropy. On the other hand, the resin blend which is further blended with the calcium carbonate in an amount of 40 parts by weight according to the present invention exhibits a thermal coefficient of contraction which is suppressed to a value of as small as 4.8% in the mechanical direction (MD), whereby the thermal coefficients of contraction are balanced in the mechanical direction (MD) and in the transverse direction (TD), and thermal anisotropy is eliminated.

Figure 2:
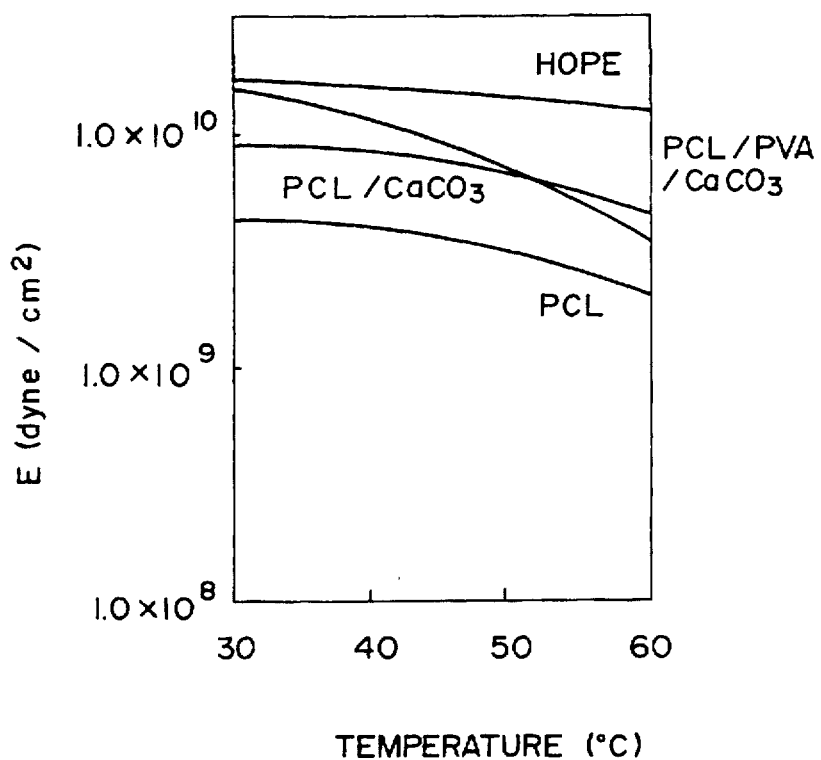
FIG. 2 is a graph plotting a relationship between the temperature and the storage modulus using a bio-disintegrable saturated polyester resin (PCL), a bio-degradable saturated polyester resin (PCL/CaCO₃) blended with the calcium carbonate, and a bio-disintegrable saturated polyester resin/hydroxyl group-containing resin (PCL/PVA/CaCO₃) blended with the calcium carbonate with a high-density polyethylene (HDPE) as standard.

FIG. 2 is a graph plotting a relationship between the temperature and the storage modulus using a bio-disintegrable saturated polyester resin (PCL), a bio-disintegrable saturated polyester resin (PCL/CaCO₃) blended with the calcium carbonate, and a bio-disintegrable saturated polyester resin/hydroxyl group-containing resin (PCL/PVA/CaCO₃) blended with the calcium carbonate with a high-density polyethylene (HDPE) as a standard.

It will be understood from FIG. 2 that the resin composition of the present invention exhibits a storage modulus near room temperature, which is larger than that of the bio-disintegrable saturated polyester resin (PCL) or that of the bio-disintegrable saturated polyester resin (PCL/CaCO₃) blended with the calcium carbonate. That is, the resin composition of the present invention maintains a storage modulus which is comparable to that of a high-density polyethylene (HDPE), i.e., maintains an excellent modulus of elasticity over a practical range of temperatures.

Figure 3:
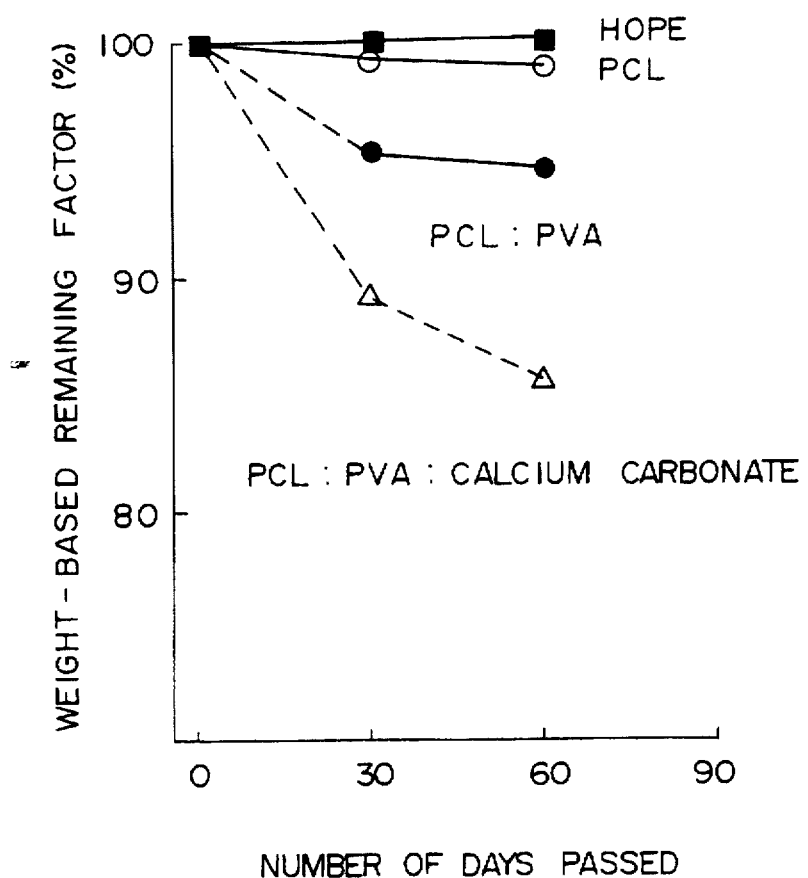
FIG. 3 is a graph plotting a relationship between the number of days that have passed and the weight-based remaining factor after buried in the earth using a bio-disintegrable saturated polyester resin (PCL), a blend (PCL/PVA) of the bio-disintegrable polyester resin and a hydroxyl group-containing resin, and a bio-disintegrable polyester resin/hydroxyl group-containing resin (PCL/PVA/CaCO₃) blended with the calcium carbonate with a high-density polyethylene (HDPE) as a standard.

FIG. 3 is a graph plotting a relationship between the number of days that have passed and the weight-based remaining factor after buried in the earth using a bio-disintegrable saturated polyester resin (PCL), a blend (PCL/PVA) of the bio-disintegrable polyester resin and a hydroxyl group-containing resin, and a bio-disintegrable polyester resin/hydroxyl group-containing resin (PCL/PVA/CaCO₃) blended with the calcium carbonate with a high-density polyethylene (HDPE) as a standard, and wherein the inclinations represent disintegrating properties.

It will be understood that the resin composition of the present invention exhibits a large disintegrating property compared with that of the bio-disintegrable saturated polyester resin (PCL) and a blend (PCL/PVA) of the bio-disintegrable saturated polyester resin and a hydroxyl group-containing resin.

The effect of the present invention in that the molded article is free from anisotropy in the mechanical strength, free from anisotropy in the thermal properties, and exhibits very enhanced bio-disintegrating property, stems from the combination of the three components, i.e., a saturated polyester resin, a hydroxyl group-containing resin and an alkaline earth metal carbonate. The effect of the present invention is not accomplished if any one of these components is missing. This improvement is presumably due to the following reasons though the invention does not necessarily remain adamant on these reasons. It is presumed that the anisotropy of a molded article of a blend is concerned to the orientations of flow of the resin components. In the case of the resin composition of the present invention, it is considered that the alkaline earth metal carbonate that is blended decreases or uniformalizes the orientations of flow and establishes a dispersion structure which is three-dimensionally stabilized and homogenized. A blend of a saturated polyester resin and a hydroxyl group-containing resin exhibits excellent bio-disintegrating property. According to the present invention, this blend is further blended with an alkaline earth metal carbonate, and it is presumed that the surfaces of the alkaline earth metal carbonate absorb water and offer active sites for bio-disintegration.

Like resin compositions blended with known fillers, the resin composition of the present invention blended with a filler of an alkaline earth metal carbonate helps decrease the cost of the molded articles, increase the rigidity of the molded articles, and improve dimensional stability of the molded articles.

(Saturated polyester resin)

A saturated polyester resin which is one of the components in the resin composition of the present invention may be any saturated polyester resin having bio-disintegrating property consisting chiefly of a hydroxyalkanoate unit. The saturated polyester resin should have a molecular weight large enough for forming at least a film, and should generally have a number average molecular weight of from $5 \times 10^4$ to $16 \times 10^4$ and, particularly, from $6 \times 10^4$ to $15 \times 10^4$. Preferred examples of the saturated polyester resin include a poly-β-hydroxyalkanoate, an aliphatic polylactone, a poly-ω-hydroxyalkanoate, or a copolymer thereof.

The poly-β-hydroxyalkanoate will be a polymer consisting of one or two or more kinds of recurring units represented by the following general formula (1)

wherein R is a straight-chain or a branched-chain alkyl group, such as, a 3-hydroxybutylate (R=—CH₃, 3HB), a 3-hydroxyvalerate (R=—CH₂CH₃, 3HV), a 3-hydroxycaproate (R=—(CH₂)₂CH₃), a 3-hydroxyheptanoate (R=—(CH₂)₃CH₃), a 3-hydroxyoctanoate (R=—(CH₂)₄CH₃), a 3-hydroxynonanoate (R=—(CH₂)₅CH₃), and a 3-hydroxydecanoate (R=—(CH₂)₆CH₃).

A preferred resin of this type will be a copolymer obtained by copolymerizing the 3-hydroxybutylate with the 3-hydroxyalkanoate and, particularly, with the 3-hydroxyvalerate at a weight ratio of from 95:5 to 85:15 and, particularly, from 92:8 to 88:12.

The aliphatic polylactone or the poly-ω-hydroxyalkanoate will be a polymer consisting of one or two or more kinds of recurring units represented by the following general formula (2).

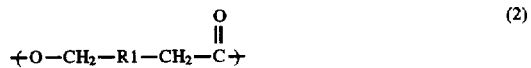

wherein R is a straight-chain or a branched-chain alkylene group, such as γ-butylolactone, δ-valerolactone and ε-caprolactone.

A preferred example of the resin of this type will be a polymer of the polycaprolatone or the caprolactone and other lactones.

It is allowable in the present invention to use a copolymer comprising a recurring unit of the formula (1) and a recurring unit of the formula (2). Its preferred example will be a copolymer of the 3-hydroxybutylate and the γ-butylolactone or the ε-captolactone. It is further allowable to use a blend consisting of two or more of the above-mentioned components. (Hydroxyl group-containing resin)

The hydroxyl group-containing resin used in the present invention has a vinyl alcohol unit represented by the following general formula (3)

in the molecular chain and is heat-moldable.

The resin consisting of only the above-mentioned vinyl alcohol unit is heat-molded with difficulty but becomes heat-moldable upon containing in the molecular chain an ethylene unit represented by the following general formula (4)

or a vinyl acetate unit represented by the following general formula (5)

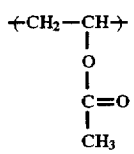

(5)

in addition to the above-mentioned vinyl alcohol unit.

A preferred example of the hydroxyl group-containing resin is a partly saponified vinyl alcohol polymer and, particularly, a polyvinyl alcohol having a saponification degree of from 40 to 80%. The polymerization degree of the vinyl alcohol polymer should lie within such a range as to form a film and generally from 300 to 800.

Another preferred example of the hydroxyl group-containing resin is an ethylene-vinyl alcohol copolymer. The ethylene-vinyl alcohol copolymer that is desirable from the standpoint of melt-moldability and gas barrier property should have an ethylene content of from 5 to 60 mol % and, particularly, from 10 to 50 mol %, and a saponification degree of not lower than 90% and, particularly, not lower than 98%. The ethylene-vinyl alcohol copolymer that is used should have a molecular weight large enough for forming a film.

(Alkaline earth metal carbonate)

The resin composition of the present invention uses an alkaline earth metal carbonate among a variety of fillers. Examples of the alkaline earth metal carbonate include carbonates of calcium, magnesium, barium and strontium. Among them, the calcium carbonate and magnesium carbonate are preferred.

There are a natural and heavy calcium carbonate having a large specific gravity and a synthetic and light calcium carbonate having a relatively small specific gravity. Though the former calcium carbonate is particularly suited for the purpose of the present invention, the latter calcium carbonate can be used for the present invention as well. Similarly, there are a natural magnesium carbonate having a relatively large particle size and a synthetic and homogeneous magnesium carbonate having a relatively small particle size. Though the former magnesium carbonate is particularly suited for the purpose of the present invention, the latter magnesium carbonate can be used for the present invention as well.

The alkaline earth metal carbonate should have a particle size or a median diameter of usually from 0.5 to 10.0 µm and, particularly, from 1.0 to 2.0 µm from the standpoint of eliminating anisotropy though there is no particular limitation as far as it disperses well.

The filler of an alkaline earth metal carbonate may be an ordinary one that has not been treated but may also be the one that has been treated with a surfactant, fatty acid, a metal soap or any other dispersing agent.

(Composition)

In the composition of the present invention, the saturated polyester resin should be used in an amount of from 20 to 85.5% by weight and, particularly, from 25 to 60% by weight, and the hydroxyl group-containing resin should be used in an amount of from 2.5 to 45% by weight and, particularly, from 5 to 40% by weight. When the amount of the saturated polyester resin is smaller than the above-mentioned range or when the amount of the hydroxyl group-containing resin is larger than the above-mentioned range, problem arouses with respect to compatibility, and bio-disintegrating property is lost. When the amount of the saturated polyester resin is larger than the above-mentioned range or when the amount of the vinyl alcohol copolymer is smaller than the above-mentioned range, on the other hand, the container becomes unsatisfactory with respect to preventing the permeation of gas and melt-moldability.

It is desired that the alkaline earth metal carbonate is used in an amount of from 5 to 50% by weight and, particularly, from 10 to 40% by weight. When the amount of the alkaline earth metal carbonate is smaller than the above-mentioned range, anisotropy in the mechanical properties and anisotropy in the thermal properties cannot be effectively eliminated and bio-disintegrating property is lost, too. When the amount of the alkaline earth metal carbonate exceeds the above-mentioned range, on the other hand, the melt-moldability is impaired and the molded article that is obtained becomes brittle.

The resin composition of the present invention can be blended with a variety of coloring agents, filler, inorganic or organic reinforcing agent, lubricating agent, plasticizer, leveling agent, surfactant, viscosity-increasing agent, viscosity-decreasing agent, stabilizer, antioxidizing agent, ultraviolet-ray absorbing agent, rust-preventing agent and the like agents depending upon the applications. In order to increase dispersion property among resins, furthermore, the resin composition of the present invention may be further blended with an ethylene-vinyl acetate copolymer.

In the resin composition of the present invention, there is no particular limitation in the manner of blending the saturated polyester resin, hydroxyl group-containing resin and alkaline earth metal carbonate. It is, however, desired to prepare a master batch by blending the saturated polyester resin and the hydroxyl group-containing resin with the alkaline earth metal carbonate, and further blend the saturated polyester resin and the hydroxyl group-containing resin with this master batch.

The composition of the present invention can be effectively used as a variety of plastic packaging containers such as bottle, cup, tube, plastic can, pouch, cap, etc., as packaging materials such as film, tray, etc., as containers for distribution such as container, tank, cage, etc., and as structural materials such as pipe, case, etc.

(Molded articles)

According to the present invention, the master batch containing (A) the saturated polyester resin or (B) the vinyl alcohol polymer and (C) the alkaline earth metal carbonate, is melted, kneaded and is blended with the remaining resin component, and is, then, kneaded and is extruded or is injected to produce a molded article such as a packaging material or a container.

In producing the packaging material and the like, one resin component blended with the ethylene-vinyl acetate copolymer and the other resin component may be fed in the form of a mixture into the hopper of an extruded or an injection machine. The mixture may be a dry blend or a melt blend of the two. The dry blending can be effected by using a variety kinds of mixers such as a ribbon blender, a conical blender or Henschel's mixer, and the melt blending can be effected by using a monoaxial extruder, a biaxial extruder, a kneader, Bumbury's mixer or a roll.

An extruder equipped with a screw can be preferably used. As the dies, there can be used a flat dies or a ring dies. The film can be molded by using a T-dies or by an inflation film-forming method. By hollow-molding a parison that is extruded, furthermore, there can be molded a hollow container such as bottle, tube, tank, etc.

The injection machine will be a known one equipped with an injection plunger or a screw, and the mixture is injected into the injection mold through a nozzle, a sprue or a gate. The resin then flows into the cavity of the injection mold and is cooled and is solidified. There is thus obtained a molded article such as a packaging material or the like.

(Multi-layer plastic container)

Figure 4:
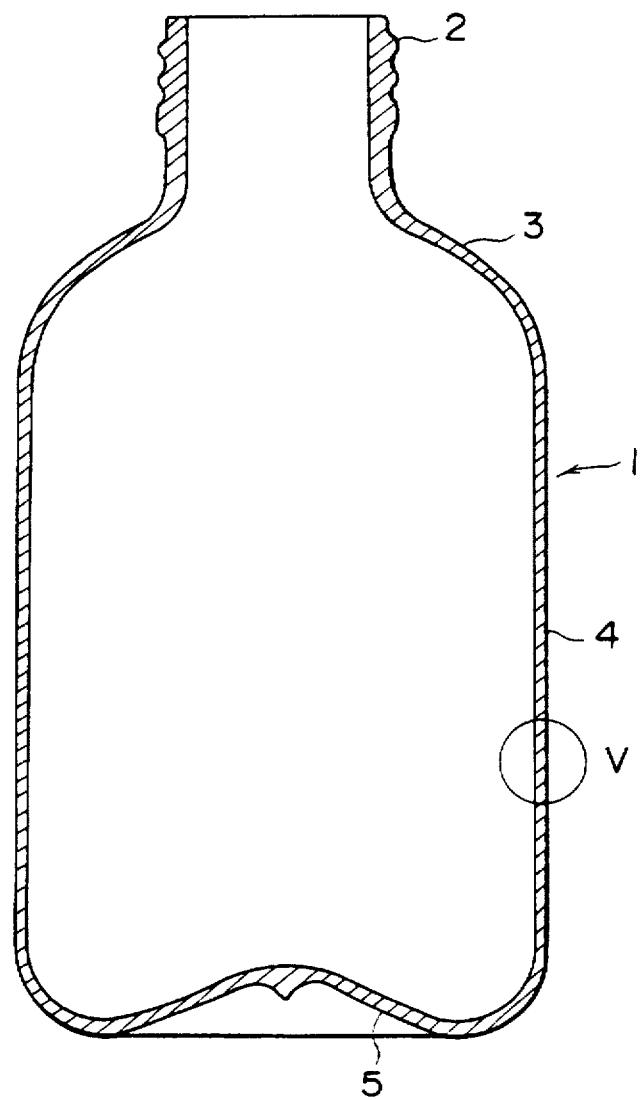
FIG. 4 is a side view illustrating a plastic container (multi-layer plastic container) of the present invention.
Figure 5:
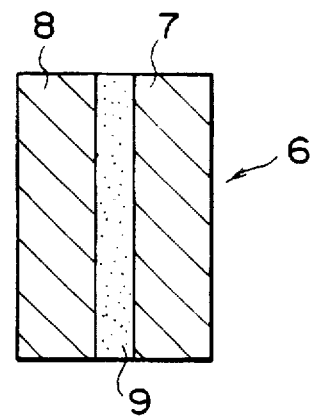
FIG. 5 is a sectional view illustrating a portion of the container of FIG. 4 on an enlarged scale.

FIG. 4 illustrates a multi-layer plastic container of the present invention, i.e., illustrates a bottle 1 obtained by blow-molding and has a mouth 2, a shoulder 3, a barrel 4 and a closed bottom 5. Referring to FIG. 5 which illustrates the wall of the container 1 in cross section, the wall 6 has an outer layer 7 consisting of a particular resin composition and an inner layer 8 consisting chiefly of the ethylene-vinyl alcohol copolymer. Though not necessarily required, an adhesive resin layer 9 may be provided between the outer layer 7 and the inner layer 8.

In this multi-layer plastic container, the above-mentioned resin composition of the present invention is used as the outer layer and the resin consisting chiefly of the ethylene-vinyl alcohol copolymer is used as the inner layer that are laminated one upon the other to constitute the container. There is no particular limitation on the resin of the inner layer provided it consists chiefly of the ethylene-vinyl alcohol copolymer. From the standpoint of preventing the permeation of gases and solvent vapor, however, it is desired to use the resin having an ethylene content of from 5 to 60 mol % and, particularly, from 10 to 40 mol % and a saponification degree of not smaller than 90% and, particularly, not smaller than 98 mol %.

In the multi-layer plastic container of the present invention, the inner layer consists of the ethylene-vinyl alcohol copolymer and the outer layer contains the hydroxyl-group containing resin. Therefore, the inner layer and the outer layer intimately adhere together; i.e., when molded by the simultaneous extrusion or the simultaneous injection, the two layers intimately adhere together without the need of using any particular adhesive agent.

In order to further improve the adhesiveness between the two resin layers, however, another layer of an adhesive agent may often be preferably provided. The adhesive agent will be an adhesive resin that exhibits good adhesiveness to the saturated polyester resin or to the hydroxyl group-containing resin, such as a low-melting copolymerized polyester, a copolymerized nylon or an acid-modified olefin resin. In the multi-layer plastic container of the present invention, it is desired that the adhesive resin too has bio-disintegrating property.

To meet this object, it is desired to use as an adhesive agent a two-component-type resin composition comprising 10 to 90% by weight of a saturated polyester resin and 10 to 90% by weight of a hydroxyl group-containing resin. The adhesive agent should not contain a filler such as an alkaline earth metal carbonate or the like, or should contain the filler in a small amount only.

In the multi-layer plastic container of the present invention, the wall as a whole should have a thickness of from 0.1 to 4.0 mm, and a thickness ratio of the outer layer to the inner layer of from 200:1 to 2:1 from the standpoint of maintaining balance in the aforementioned properties, though they may vary depending upon the size of the container and the applications where it is used.

The multi-layer plastic container of the present invention can be produced through a widely known means such as simultaneous multi-layer extrusion, simultaneous or sequential multi-layer extrusion, extrusion coating, sandwich lamination or dry lamination.

First, a master batch containing (A) the saturated polyester resin or (B) the vinyl alcohol polymer and (C) the alkaline earth metal carbonate, is melted and kneaded, and is blended with the remaining resin component. The resulting blend is then kneaded and is extruded or is injected to form the outer layer of the multi-layer plastic container. The mixture may be a dry blend or a melt blend of the two components. The dry blending can be effected by using a variety of mixers such as a ribbon blender, a conical blender or Henschel's mixer and the melt blending can be effected by using a monoaxial or biaxial extruder, a kneader, Bumbury's mixer or a roll.

On the other hand, the ethylene-vinyl alcohol copolymer and the adhesive resin are extruded or injected by using a specially designed extruder or injection machine; i.e., the ethylene-vinyl alcohol copolymer and the adhesive resin are extruded in the form of multiple layers through a multi-layer multiplex dies or are injected through a multi-layer multiplex nozzle.

The extruder will be the one equipped with any screw, and the dies will be a flat dies or a ring dies. The multi-layer film is molded by, for example, a T-dies method or an inflation film-forming method. A multi-layer parison that is extruded is hollow-molded to obtain a hollow-molded container such as a multi-layer bottle, tube, tank, etc.

The injection machine will be a known one equipped with an injection plunger or a screw, and the copolymer and the resin are injected in the form of multiple layers into the injection mold. That is, the resin layers flow into the cavity of the injection mold, cooled and solidified to turn into a multi-layer molded article.

The multi-layer plastic container of the present invention is useful as, for example, a bottle, a cup, a tube, a plastic can, a pouch, a cap, etc., and as a packaging container such as a film, a tray, etc. In particular, the multi-layer plastic container of the invention is useful as a container for containing and preserving contents that contain organic solvents, such as a variety of agricultural chemicals, adhesive agents, chemicals, paints and the like. The plastic containers that are happened to be discarded outdoors, are reduced into the earth.

EXAMPLES

The invention will now be described by way of Examples.
1) The resin composition of the present invention was obtained by using a polycaprolactone H7S produced by Daicel Kagaku Kogyo Co. as a saturated polyester consisting chiefly of a poly-ω-hydroxyalkanoate unit and by using a partly saponified polyvinyl alcohol HM005 or an ethylene-vinyl alcohol copolymer E-151 produced by Kurare Co. as a heat-moldable hydroxyl group-containing resin having a vinyl alcohol unit. As an alkaline earth metal carbonate, furthermore, there was used Softon 1200 (Whiton SB (red)) produced by Shiraishi Calcium Co. For the purpose of comparison, furthermore, PKP-80 produced by Fuji-Talc Co. and Minex 10 produced by Shiraishi Kogyo Co., were used as inorganic fillers.

There was further used a dispersing agent of a metal stearate for dispersing the above inorganic fillers.

In the case of the multi-layer plastic container, the above-mentioned resin composition was used as the outer layer, and the ethylene-vinyl alcohol copolymer E-151 produced by Kurare Co. was used as the heat-moldable hydroxyl group-containing resin having a vinyl alcohol unit for forming the inner layer.

2) Molding method
2-1) Preparation of master batch

There were used Bumbury's mixer Mixtron BB-120 produced by Kobe Seikosha Co and Kneadex CMS-300-2250 (open-roll extruder) produced by Color Metal Co. The number of revolutions of the Bumbury's mixer was set at 30 rpm. The kneading was continued up to a temperature range of 160° C. where the load upon the motor of the Bumbury's mixer was stabilized, followed by hot-cutting at 100° C. after cooled in the air by using the Kneadex and, then, followed by supercooling to obtain a master batch in a pelletized form.

2-2) Forming a sheet

The above master batch was dry-blended with a composition consisting of suitable amounts of the polycaprolactone and the partly saponified polyvinyl alcohol, and the blend was formed into a sheet having a thickness of 1 mm and a width of 120 mm by using a molding machine, RABO-PLASTOMILL Model C, (D-20-20) and a sheet-winding machine produced by Toyo Seiki Seisakusho Co. at a molding temperature of 170° C. while revolving the screw at 100 rpm.

2-3) Forming a bottle

A cylindrical bottle was direct-blow-molded by using an extruder (40 φ) and (50 φ), Model ES65, produced by Ikegai Co., under the conditions a molding temperature of 170° C., revolving speed of the screw of 40 rpm, a metal mold temperature of 16° C., and a blow air pressure of 6 kg/cm$^2$.

3) Measuring method 3-1) Evaluating the mechanical properties

A piece of sheet dried for 75 hours under a reduced pressure and a piece of sheet left to stand at 25° C. RH 60% for 75 hours were bent by 180 degrees to observe cracks.

By using Tensilon, Model UCT-5T, produced by Orientec Co., furthermore, a stress-strain curve was found under the conditions of a load cell of 100 kg, a distance between chucks of 30 mm and a tension speed of 500 mm/min. An yield elongation (%) was found from the thus obtained stress-strain curve. The shape of the sample was measured by using ASTMD-1822.

3-2) Evaluating the disintegration and deterioration

Small pieces of the sheet measuring 30 mm×50 mm were buried in the earth. After 30 days and 60 days have passed, the sheet pieces were dug up, washed with the water, dried for 75 hours under a reduced pressure, and were accurately weighed using a chemical balance. The obtained results are expressed as the initial weight ($\omega_0$) and the weight-based remaining factor (%) ($\omega_1/\omega_0$) ×100 where $\omega_1$ is the weight when dug up.

(Example 1)

A dispersing agent consisting chiefly of a calcium stearate was added in an amount of 3 g per a kilogram of a blend of three components, i.e.,(A) a polycaprolactone having a number average molecular weight of 130000, (B) a 60%-saponified polyvinyl alcohol having a polymerization degree of 500, and (C) a calcium carbonate having an average particle size of 1.8 μm at a weight ratio of (A):(B):(C)= 12:8:80, and the mixture was kneaded using the Bumbury's mixer. After kneaded using the Bumbury's mixer, a pelletized master batch was continuously formed by using the Kneadex.

To the above master batch was added a suitable amount of a two-component composition comprising (A) the polycaprolactone and (B) the partly saponified polyvinyl alcohol at a weight ratio (A):(B) of 60:40, and a sheet was molded by using the RABOPLASTOMILL sheet-molding machine.

1) Mechanical properties

Mechanical properties of the thus molded sheet were as shown in Table 1 and in FIG. 1. Table 1 shows the results of observation of cracks when the sheet was bent by 180 degrees, and FIG. 1 shows yield elongations (%) as found from a stress-strain curve.

From Table 1, cracks were observed in the sheet in which the two components were contained, i.e., (A) the polycaprolactone and (B) the partly saponified polyvinyl alcohol were contained at a weight ratio (A):(B) of 60:40. However, no crack was observed in the sheet of the three-component type which further contained (C) the calcium carbonate in addition to the above resin composition.

Referring to Table 1 and FIG. 1, anisotropy in the yield elongation was observed in MD and TD in the sheet comprising two components, i.e., (A) the polycaprolactone and (B) the partly saponified polyvinyl alcohol at a weight ratio (A):(B) of 60:40. However, anisotropy in the yield elongation was improved when the above resin composition was blended with (C) the calcium carbonate. The improved yield elongation remained at a constant value despite of an increase in the amount of the calcium carbonate.

2) Evaluating disintegration and deterioration

Master batches of three components, i.e., (A) the polycaprolactone, (B) the partly saponified polyvinyl alcohol and (C) the calcium carbonate were prepared at weight ratios of (A):(B):(C)=13:7:80 and (A):(B):(C)=20:0:80 in addition to the above-mentioned three-component composition for forming a sheet. To the master batches were added suitable amounts of mixture compositions of (A) the polycaprolactone and (B) the partly saponified polyvinyl alcohol at different ratios, in order to mold sheets of three-component compositions of different ratios. The sheets were buried in the earth. Table 2 shows the weight-based composition ratios of the sheets that were buried and the weight-based remaining factor (%) after dug up.

From Table 2, the weight of these sheet pieces decreased in the order of:

Three-component system comprising (A) the polycaprolactone, (B) the partly saponified polyvinyl alcohol and (C) the calcium carbonate, The two-component system comprising (A) the polycaprolactone and (C) the calcium carbonate, The two-component system comprising (A) the polycaprolactone and (B) the partly saponified polyvinyl alcohol, and The polycaprolactone (A) alone.

In particular, though the two-component system comprising (A) the polycaprolactone and (C) the calcium carbonate exhibited a reduction in the weight that was not affected by the concentration of calcium carbonate, the three-component system comprising (A) the polycaprolactone, (C) the calcium carbonate and (B) the partly saponified polyvinyl alcohol exhibited a characteristic decrease in the weight, i.e., the weight decreased at an increased rate with an increase in the concentration of calcium carbonate.

(Example 2)

A dispersing agent consisting chiefly of a calcium stearate was added in an amount of 3 g per a kilogram of a blend of three components, i.e.,(A) a polycaprolactone having a number average molecular weight of 130000, (B) a 60%-saponified polyvinyl alcohol having a polymerization degree of 500, and (C) a calcium carbonate having an average particle size of 1.8 μm at a weight ratio of (A):(B):(C)= 13:7:80, and the mixture was kneaded using the Bumbury's mixer. After kneaded using the Bumbury's mixer, a pelletized master batch was formed by using the Kneadex.

To the above master batch was added a suitable amount of a two-component composition comprising (A) the polycaprolactone and (B) the partly saponified polyvinyl alcohol at a weight ratio (A):(B) of 65:35, and a 100-ml bottle was direct-blow-molded having a composition of three components at a weight ratio of (A):(B):(C) of 39:21:40.

Properties related to the strength were the same as those of Example 1.

After filled with white sand, the bottles were hermetically sealed. Ten such bottles were allowed to fall from a height of 1.2 mm but no bottle was broken.

(Comparative Example 1)

The procedure was carried out all in the same manner as in Example 1 but using talc having an average particle size of 5.0 μm to 6.0 μm (PKP-80 produced by Fuji Talc Co.) as the inorganic filler.

(Comparative Example 2)

The procedure was carried out all in the same manner as in Example 1 but using Minex having an average particle size of 2.3 μm (Minex 10 produced by Shiraishi Kogyo Co.) as the inorganic filler.

A dispersing agent consisting chiefly of a calcium stearate was added in an amount of 3 g per a kilogram of a blend of three components, i.e., (A) a polycaprolactone having a number average molecular weight of 130000, (B) a 60%-saponified polyvinyl alcohol having a polymerization degree of 500, and (C) a calcium carbonate having an average particle size of 1.8 μm at a weight ratio of (A):(B):(C)= 13:7:80, and the mixture was kneaded using the Bumbury's mixer. After kneaded using the Bumbury's mixer, a pelletized master batch was continuously formed by using the Kneadex.

To the above master batch was added a suitable amount of a two-component composition comprising (A) the polycaprolactone and (B) the partly saponified polyvinyl alcohol at a weight ratio (A):(B) of 65:35, to prepare a composition having (A):(B):(C) in a ratio of 39:21:40 and the resulting

TABLE 1

| | Composition ratio (wt %) | | | | Crack at 180° bending | |
|---|---|---|---|---|---|---|
| | Saturated aliphatic polyester resin (A) | Hydroxy group-containing resin (B) | Inorganic filler Name of filler | Amount | MD | TD |
| Comparative Example | 60 | 40 | — | 0 | cracked | partly cracked |
| Example 1 | 48 | 32 | calcium carbonate (C) | 20 | none | none |
| Example 1 | 42 | 28 | calcium carbonate (C) | 30 | none | none |
| Example 1 | 36 | 24 | calcium carbonate (C) | 40 | none | none |
| Comparative Example 1 | 36 | 24 | talc | 40 | cracked | cracked |
| Comparative Example 2 | 36 | 24 | Minex | 40 | cracked | cracked |

TABLE 2

| | Composition ratio (wt %) | | | Hydroxyl group-containing resin Resin component ratio (%) (B)/((A) + (B)) | Weight-based remaining factor (%) | | |
|---|---|---|---|---|---|---|---|
| | Saturated polyester resin (A) | Hydroxyl group-containing resin (B) | Calcium carbonate | | Before buried | After 30 days | After 60 days |
| 2-Component system of saturated aliphatic polyester and hydroxy group-containing resin | 100 | 0 | 0 | 0 | 100 | 99.4 | 99.0 |
| | 80 | 20 | 0 | 20 | 100 | 98.3 | 98.1 |
| | 60 | 40 | 0 | 40 | 100 | 95.6 | 94.9 |
| 2-Component system of saturated aliphatic polyester and Ca carbonate | 80 | 0 | 20 | 0 | 100 | 98.5 | 97.8 |
| | 70 | 0 | 30 | 0 | 100 | 98.1 | 97.1 |
| | 60 | 0 | 40 | 0 | 100 | 98.3 | 97.5 |
| 3-Component system of saturated aliphatic polyester, hydroxyl group-containing resin, Ca carbonate | 56 | 24 | 20 | 30 | 100 | 96.1 | 94.8 |
| | 49 | 21 | 30 | 30 | 100 | 96.0 | 94.8 |
| | 42 | 18 | 40 | 30 | 100 | 95.1 | 93.3 |
| 3-Component system of saturated aliphatic polyester, hydroxyl group-containing resin, Ca carbonate | 48 | 32 | 20 | 40 | 100 | 94.4 | 91.7 |
| | 42 | 28 | 30 | 40 | 100 | 91.0 | 88.2 |
| | 36 | 24 | 40 | 40 | 100 | 89.4 | 85.9 |

(Example 3)
(Multi-layer plastic container)

composition was processed by direct-blow molding in accordance with the procedure mentioned in the above molding method. There was molded a hollow bottle of a two-layer structure, the inner layer consisting of an ethylene-vinyl alcohol copolymer that does not dissolve in an organic solvent, and the outer layer having a thickness of 900 μm and the inner layer having a thickness of 100 μm.

To examine the strength, the bottle was filled with xylene and was hermetically sealed with a core plug. Ten such bottles were allowed to fall from a height of 1.2 mm but no bottle was broken.

Figure 6:
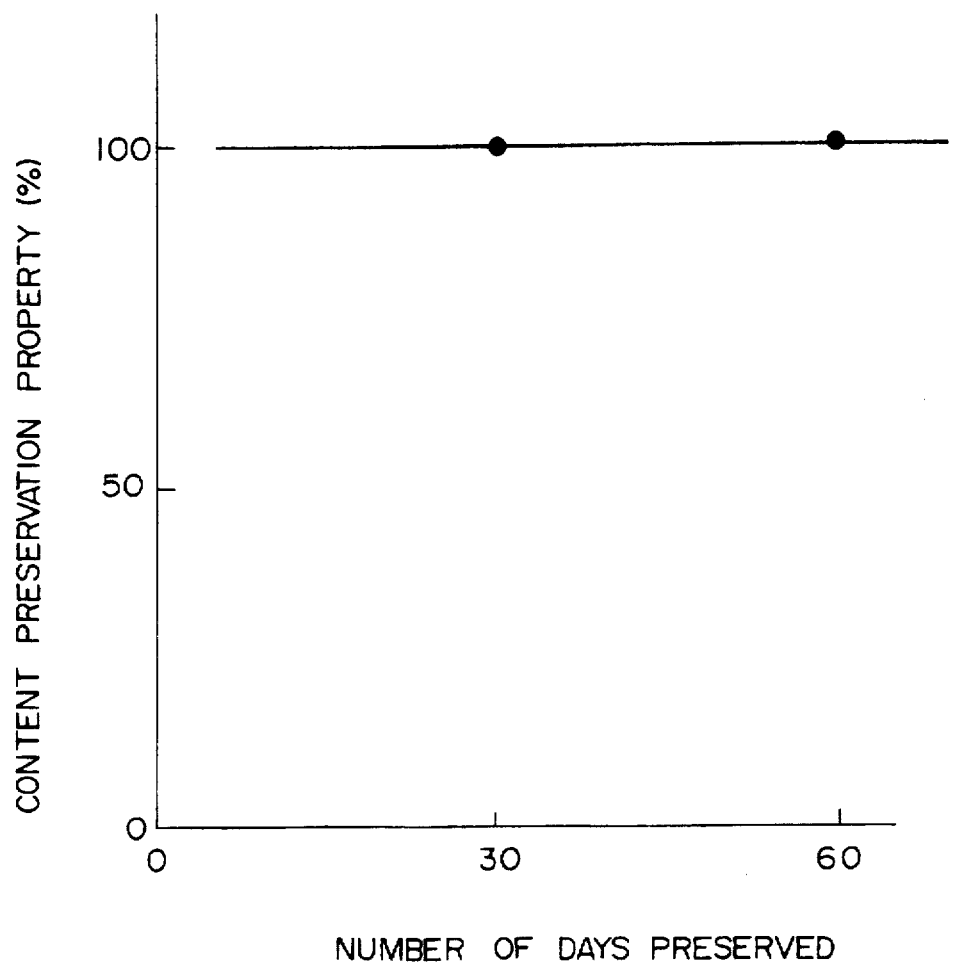
FIG. 6 is a graph showing a relationship between the number of days that have passed and the content preservation property (weight-based holding factor) of when the container of Example 3 is filled with xylene.

FIG. 6 illustrates content preservation property of when the bottle is filled with xylene, from which it will be understood that the bottle does not dissolve in an organic solvent such as xylene or the like. A hollow bottle having only an outer layer of the resin composition dissolves in an organic solvent and is not capable of preserving content such as an organic solvent.

When the outer layer was composed of the resin composition containing an inorganic filler such as calcium carbonate, the draw-down was improved during the molding and the article could be molded stably and continuously.

(Example 4)

The procedure was carried out all in the same manner as in Example 1 but using an ethylene-vinyl alcohol resin (D) having an ethylene content of 40 mol % as a heat-moldable hydroxyl group-containing resin having a vinyl alcohol unit for forming the outer layer.

After filled with xylene, the bottle was hermetically sealed with a core plug. Ten such bottles were allowed to fall from a height of 1.2 m but no bottle was broken. When the outer layer was composed of the resin composition containing an inorganic filler of calcium carbonate, the draw-down was improved during the molding and the article could be molded stably and continuously.

(Example 5)

The outer layer and the inner layer were the same as those of Example 3 but adhering the outer layer and the inner layer together via an intermediate layer of a two-component composition comprising (A) the polycaprolactone having a number average molecular weight of 130000 and (D) the ethylene-vinyl alcohol copolymer having an ethylene content of 40 mol % at a weight ratio (A):(B) of 40:60.

A hollow bottle was molded having a wall made up of three layers of three kinds, the outer layer being 900 μm thick, the intermediate layer being 10 μm thick, and the inner layer being 100 μm thick.

To examine the mechanical properties, the bottle was filled with xylene and was hermetically sealed with a core plug. Ten such bottles were allowed to fall from a height of 1.2 m but no bottle was broken.

Use of the adhesive layer made it possible to obtain a stronger adhesiveness than that of Examples 3 and 4 in which the interfaces of the inner layer and of the outer layer had been intimately adhered together. It is a feature of the present invention in that the adhesive layer is composed of only a resin that has bio-disintegrating property.

We claim:

1. A resin composition having improved mechanical properties and bio-disintegrating property comprising a saturated polyester resin consisting essentially of a hydroxyalkanoate unit, a heat-moldable hydroxyl group-containing resin having a vinyl alcohol unit, and an alkaline earth metal carbonate, wherein the saturated polyester resin is present in an amount of from 20 to 85.5% by weight, the hydroxyl group-containing resin is present in an amount of from 2.5 to 45% by weight and the alkaline earth metal carbonate is present in an amount of from 10 to 50% by weight based upon a combined total weight of the saturated polyester resin, hydroxyl group-containing resin, and alkaline earth metal carbonate.

2. A resin composition according to claim 1, wherein the saturated polyester resin is an aliphatic polylactone or a poly-ω-hydroxyalkanoate.

3. A resin composition according to claim 1, wherein the saturated polyester resin is a poly-β-hydroxyalkanoate.

4. A resin composition according to claim 1, wherein the hydroxyl group-containing resin is a polyvinyl alcohol having a saponification degree of from 40 to 80%.

5. A resin composition according to claim 1, wherein the hydroxyl group-containing resin is an ethylene-vinyl alcohol copolymer having an ethylene content of from 5 to 50 mol % and a saponification degree of not smaller than 90%.

6. A resin composition according to claim 1, wherein the alkaline earth metal carbonate is a calcium carbonate.

7. A resin composition according to claim 1, wherein the alkaline earth metal carbonate is a magnesium carbonate.

8. A plastic container having improved mechanical properties and bio-disintegrating property formed of a resin composition which comprises a saturated polyester resin consisting essentially of a hydroxyalkanoate unit, a heat-moldable hydroxyl group-containing resin having a vinyl alcohol unit, and an alkaline earth metal carbonate, wherein the resin composition contains the saturated polyester resin in an amount of from 20 to 85.5% by weight, the hydroxyl group-containing resin in an amount of from 2.5 to 45% by weight and the alkaline earth metal carbonate in an amount of from 10 to 50% by weight based upon a combined total weight of the saturated polyester resin, hydroxyl group-containing resin and alkaline earth metal carbonate.

* * * * *